United States Patent
Johannessen (10) Patent No.: US 10,175,377 B2
(45) Date of Patent: Jan. 8, 2019

(54) SIGNAL AND POWER TRANSMISSION IN HYDROCARBON WELLS

(75) Inventor: Kjetil Johannessen, Trondheim (NO)

(73) Assignee: STATOIL PERTOLEUM AS, Stavanger (NO)

( * ) Notice: Subject to any disclaimer, the term of this patent is extended or adjusted under 35 U.S.C. 154(b) by 35 days.

(21) Appl. No.: 13/982,920

(22) PCT Filed: Feb. 11, 2011

(86) PCT No.: PCT/EP2011/052065
§ 371 (c)(1),
(2), (4) Date: Aug. 20, 2013

(87) PCT Pub. No.: WO2012/107108
PCT Pub. Date: Aug. 16, 2012

(65) Prior Publication Data
US 2013/0321165 A1 Dec. 5, 2013

(51) Int. Cl.
*G01V 3/18* (2006.01)
*G01V 13/00* (2006.01)
*E21B 17/00* (2006.01)
*E21B 41/00* (2006.01)
*E21B 47/12* (2012.01)

(52) U.S. Cl.
CPC .............. *G01V 3/18* (2013.01); *E21B 17/003* (2013.01); *E21B 41/0035* (2013.01); *E21B 47/12* (2013.01); *G01V 13/00* (2013.01); *Y10T 29/49117* (2015.01)

(58) Field of Classification Search
None
See application file for complete search history.

(56) References Cited

U.S. PATENT DOCUMENTS

| 5,697,445 | A | * | 12/1997 | Graham | 166/313 |
| 5,732,776 | A | * | 3/1998 | Tubel et al. | 166/250.15 |
| 5,745,047 | A |   | 4/1998 | Van Gisbergen et al. | |
| 5,941,307 | A | * | 8/1999 | Tubel | E21B 34/066 166/313 |
| 6,515,592 | B1 | * | 2/2003 | Babour et al. | 340/854.4 |
| 2001/0035288 | A1 | * | 11/2001 | Brockman et al. | 166/65.1 |

(Continued)

FOREIGN PATENT DOCUMENTS

EP 0 964 134 A2 12/1999
WO WO 2007/004891 A1 1/2007

*Primary Examiner* — Chico A Foxx (74) *Attorney, Agent, or Firm* — Birch, Stewart, Kolasch & Birch, LLP (57) ABSTRACT

One aspect relates to a method of installing a transmission system in a hydrocarbon production well. The transmission system is operable for transmitting power and/or control signals down the well or for transmitting data signals back up the well. The well comprises a main well bore, a production tubing inside the main well bore and a branch off the production tubing. The branch comprises a side track tubing. The method includes: providing a sensor and/or load assembly in the branch; installing a first inductive coupler of an induced current transmission arrangement around the production tubing in the main well bore, and connecting the sensor/load assembly to the first inductive coupler via a communication link. Another aspect relates to a hydrocarbon production well installation.

34 Claims, 7 Drawing Sheets

(56) References Cited

U.S. PATENT DOCUMENTS

| | | | |
|---|---|---|---|
| 2002/0084913 A1* | 7/2002 | Hudson | E21B 47/121 340/853.1 |
| 2002/0126021 A1* | 9/2002 | Vinegar | E21B 43/122 340/854.3 |
| 2003/0227393 A1* | 12/2003 | Vinegar | E21B 17/003 340/854.3 |
| 2004/0007945 A1* | 1/2004 | Gouk et al. | 310/317 |
| 2004/0060693 A1* | 4/2004 | Bass et al. | 166/57 |
| 2004/0094303 A1 | 5/2004 | Brockman et al. | |
| 2008/0041576 A1* | 2/2008 | Patel et al. | 166/65.1 |
| 2009/0066535 A1* | 3/2009 | Patel et al. | 340/853.2 |
| 2009/0151950 A1* | 6/2009 | Patel | 166/298 |
| 2009/0236144 A1* | 9/2009 | Todd | E21B 17/01 175/5 |
| 2010/0183313 A1* | 7/2010 | Rhodes | H04B 13/02 398/104 |
| 2011/0192596 A1* | 8/2011 | Patel | E21B 17/028 166/250.11 |
| 2013/0120093 A1* | 5/2013 | Deville et al. | 336/115 |

\* cited by examiner

SIGNAL AND POWER TRANSMISSION IN HYDROCARBON WELLS

FIELD OF THE INVENTION

The present invention relates to the transmission of power and signals in hydrocarbon wells, and more particularly, but not exclusively, to transmission in through-tubing radial branches.

BACKGROUND

A variety of technologies have been developed for transmitting power and or signals (such as data signals from sensors or control signals for controlling devices) to/from deep underground in hydrocarbon production wells. One such technology involves the use of current transformers to induce a current onto the tubing and pick it up again from the tubing. An example of this technology is described in WO2007/004891. Current transformers (as referred to herein) essentially consist of a closed loop of inductive material enclosing the tubing.

Other technologies include using inductive coupling in the use of coupled loop antennas. As referred to hereafter, the term "inductive coupler" refers to any form of construction where a current or magnetic field is induced, and unless indicated otherwise includes current transformers as well as other types of inductive coupling devices. There have also been quite a few attempts at making down-hole wet mate cable connectors, both for electrical and optical connections, but generally so far the results are at best questionable.

Through Tubing Rotary Drilling (TTRD) has become established as a cost-effective method of increasing access to hydrocarbon reserves. Using existing wells in mature reservoirs, additional reserves are accessed through the existing well completion tubing by drilling new sidetracks branching off the existing production tubing. However, well branches such as TTRD branches present considerable problems, particularly for installing signal and power transmission systems. The cables in cable systems are especially vulnerable to damage. Also, the existing current transformer or inductive coupling technologies have a major problem if there is a short circuit between the inside of the tubing and the annulus fluid between the production tubing and the well bore along a long length of transmission. The annulus fluid could typically be a brine containing corrosion inhibitors, but could be diesel or other non-conductive and non-corrosive fluid.

Accordingly, there is a need for an improved way of making a connection to an induced-current (or similar) system for power and/or data signal transmissions in a well branch, where the new completion is not brought back to the surface but is hung off in the production tubing. The same principles may be used both for TTRD branches and in many other well branch constructions.

SUMMARY

According to a first aspect of the invention there is provided a method of installing a transmission system in a hydrocarbon production well. The transmission system is operable for transmitting power and/or control signals down the well or for transmitting data signals back up the well. The well comprises a main well bore, a production tubing inside the main well bore and a branch off the production tubing. The branch comprises a side track tubing. The method includes: providing a sensor and/or load assembly in the branch; installing a first inductive coupler of an induced current transmission arrangement around the production tubing in the main well bore, and connecting the sensor/load assembly to the first inductive coupler via a communication link.

In one embodiment, the communication link comprises a cable, and connecting the cable between the sensor assembly and the first inductive coupling comprises joining two sections of cable in a side pocket on the production tubing. The cable may be fed from the sensor/load assembly to the side pocket inside the side track tubing. Alternatively, the cable may be fed from the sensor/load assembly to the side pocket outside the side track tubing.

In another embodiment, the communication link comprises an induced current signal transmission arrangement and the method further comprises installing a second inductive coupler of the signal transmission arrangement around the side track tubing in the branch. The first inductive coupler may be installed in the main well bore at a position selected to minimise any current induced in the production tubing when an alternating current is applied to the first inductive coupler. The method may further comprise connecting a cable between the first inductive coupler and a node at a location higher up the main well bore for relaying data signals and/or for supplying power and/or control signals. Alternatively, the method may further comprise installing an induced current signal transmission arrangement for relaying data signals from the first inductive coupler to a node at a location higher up the well and/or for supplying power and/or control signals to the first inductive coupler.

The method may further comprise installing a third inductive coupler around the production tubing in the main well bore such that the branch exits the production tubing between the first and third inductive coils. The method may also further comprise providing a second sensor and/or load assembly in the main well bore below the branch to provide sensor data signals to and/or receive power and/or control signals from the third inductive coil.

One or more of the inductive couplers may have an impedance matched to that of another coupler to optimise power and/or signal transfer.

The method may further comprise providing electrical insulation to at least a portion of the production tubing and/or the side track tubing for reducing losses due to parasitic conductance from the tubing.

According to a second aspect of the present invention there is provided a hydrocarbon production well installation comprising: a main well bore; a production tubing inside the main well bore; and a branch off the production tubing, the branch comprising a side track tubing. A sensor and/or load assembly in the branch provides sensor data signals and/or receives power and/or receives control signals. A communication link relays the sensor data signals to and/or power/control signals from a first inductive coupler of an induced current transmission arrangement, the first inductive coupler being disposed around the production tubing in the main well bore.

The branch may be a TTRD branch wherein the side track tubing extends from inside the production tubing into the TTRD branch.

The communication link may comprise a cable. The cable may extend from the sensor assembly to a side pocket on the production tubing.

Alternatively, the communication link may comprise a second inductive coupler of the signal transmission arrangement, the second inductive coupler being disposed around the side track tubing. Preferably the first inductive coupler is disposed in the main well bore at a position selected to minimise any current induced in the production tubing when an alternating current is applied to the first inductive coupler. The first inductive coupler may comprise a coil around the sidetrack tubing and inside the production tubing. The communication link may further comprise an induced current signal transmission arrangement in the TTRD branch between the sensor/load assembly and the second inductive coupler. The installation may further comprise an electrical signal conditioning device disposed in the TTRD branch between the sensor/load assembly and the second inductive coupler.

The installation may further comprise a cable connected to the first inductive coupler for relaying data signals to a node at a location higher up the well and/or for supplying power and/or control signals.

Alternatively, the installation may further comprise an induced current signal transmission arrangement for relaying data signals from the first inductive coupler to a node at a location higher up the well and/or for supplying power and/or control signals to the first inductive coupler. The induced current signal transmission arrangement may comprise a third inductive coupler, the first and third inductive couplers being implemented as one device.

The induced current signal transmission arrangement in the main well bore may further comprise a third inductive coupler disposed around the production tubing, wherein the TTRD branch exits the production tubing between the first and third inductive coils. The installation may further comprise a second sensor and/or load assembly disposed in the main well bore providing sensor data signals to and/or receiving power and/or control signals from the third inductive coil. The production tubing between the first and third inductive coils may comprise an electrical insulation material or coating. An electrical connection may be provided between the insulated section of the production tubing and a side stack tubing of the TTRD branch via slips or other mechanical contacts.

The first/second/third inductive couplers may be current transformers.

One or more of the inductive couplers may have an impedance matched to that of another coupler to optimise power and/or signal transfer.

At least a portion of the production tubing and/or the side track tubing may comprise electrical insulation for reducing losses due to parasitic conductance from the tubing. The insulation may comprise one or more of: a coating on the tubing; a non-conductive annulus fluid; non-conducting tubing centralizers; in-cemented sections of tubing comprising cement or other curing substances, such as polymers, with low electrical conductivity; and parts of the tubing formed of a material having a low electrical conductivity.

Figure 1:
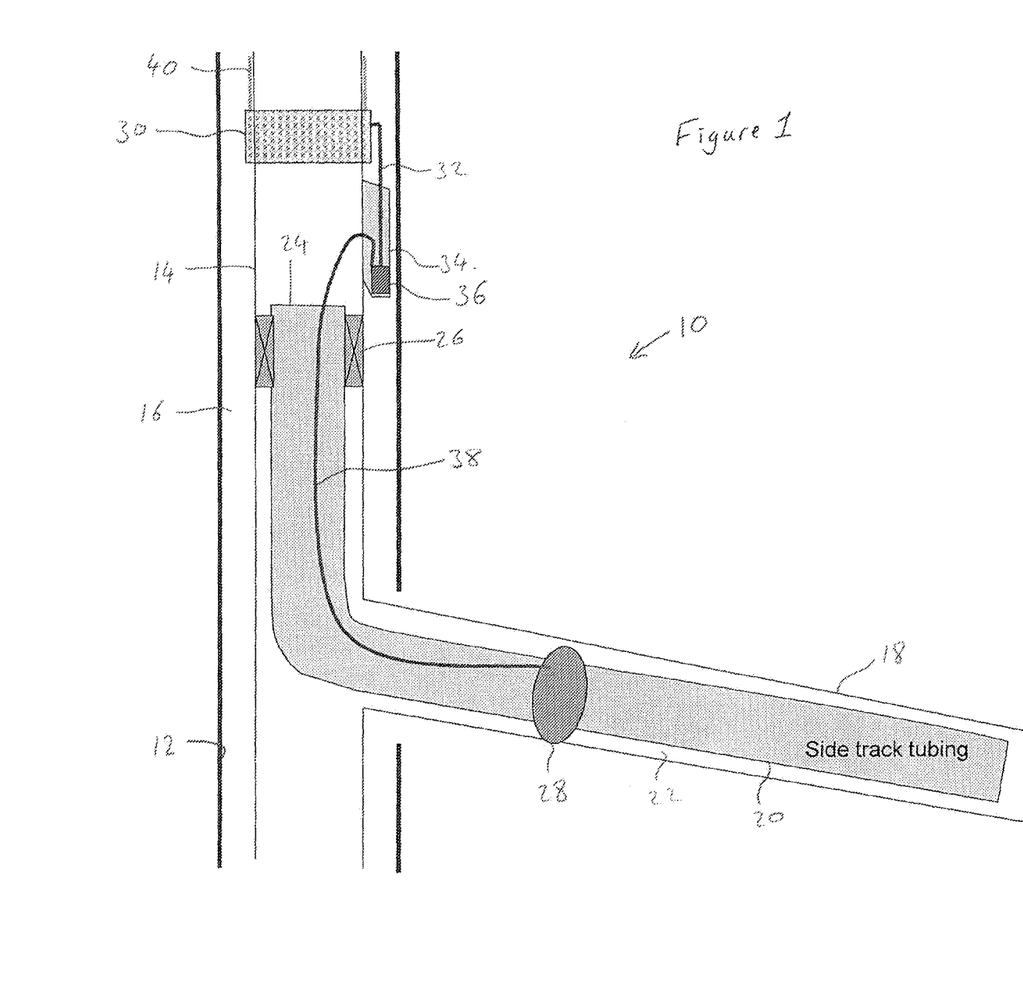
FIG. 1 illustrates an embodiment of a connection for transmitting power and/or signals to/from a location in a well branch.

The embodiments show four principle ways that an induced current arrangement can be used for transmitting power and/or signals in a well having a TTRD branch. Referring to FIG. 1, a hydrocarbon production well 10 has a main well bore 12. Well bore 12 would typically be a bore drilled through a "formation"—i.e. layers of rock, sand, clay or combinations of these as might occur either in a well drilled or land or sub-sea under the sea bed. In many wells the bore is lined with a casing or liner, but in some wells the bore is left un-lined. Inside the well bore 12 is a production liner or tubing 14. An annular space 16 separates the production tubing 14 from the formation around the well bore 12. The annular space 16 may be filled with cement, which both fixes the tubing 14 in place and, at least where the formation is hydrocarbon-bearing, is porous to act as a filter for hydrocarbons that are extracted from the well. Alternatively, in other parts of the well, the tubing may be surrounded by an annulus fluid such as a heavy completion fluid like the brine containing corrosion inhibitors referred to above. The annulus fluid could also comprise hydrocarbon fluids, which could be the diesel referred to above or a production fluid or a low density fluid, typically dry gas used to help lifting the well fluids.

A TTRD branch 18 comprises tubing that branches off the production tubing 14 to form a sidetrack assembly through the formation. The sidetrack assembly includes side track tubing 20 inside the branch 18 and surrounded by an annular space 22. Depending on the production requirements the annular space 22 may also be filled with cement. The side track tubing 20 is of smaller diameter than the production tubing 14 in the main well bore 12. The side track tubing 20 has a top open end 24, and extends into the branch 18 as shown. The top open end 24 is held concentrically in position by hangers, which in this case are in the form of packers 26, but could also be permeable constructions in the production tubing 14. The side track might typically extend for a large distance (e.g. many kilometers).

A sensor/load assembly 28 is located on the side track tubing 20 in the branch 18. This might comprise sensors such as pressure gauges, or powered devices such as actuators for moving components situated in the branch/sidetrack. The sensor/load assembly 28 therefore requires a power supply as well as a communication link for receiving control signals controlling the powered devices and sending sensor data back to the surface or, in principle, to any upper node position higher in the well. In this embodiment power is delivered from an upper node position and data signals transmitted back to the same or another upper node position using an induced current/current transformer system, one end of which is shown in the form of an inductive coupler 30. The inductive coupler 30 is energised by a magnetic field or current induced in the production tubing 14 in a known manner (as described, for example, in WO2007/004891). The connection from the inductive coupler 30 to the sensor/ load in the branch 18 is provided from via a first cable 32 from the inductive coupler 30 to a side pocket 34 on the outside of the production tubing 14 and in the annular space 16. A cable connector is located in the side pocket 34, which connects the first cable 32 to a second cable 38 that is fed through the wall of the production tubing 14 to inside the side track tubing 20.

Figure 2:
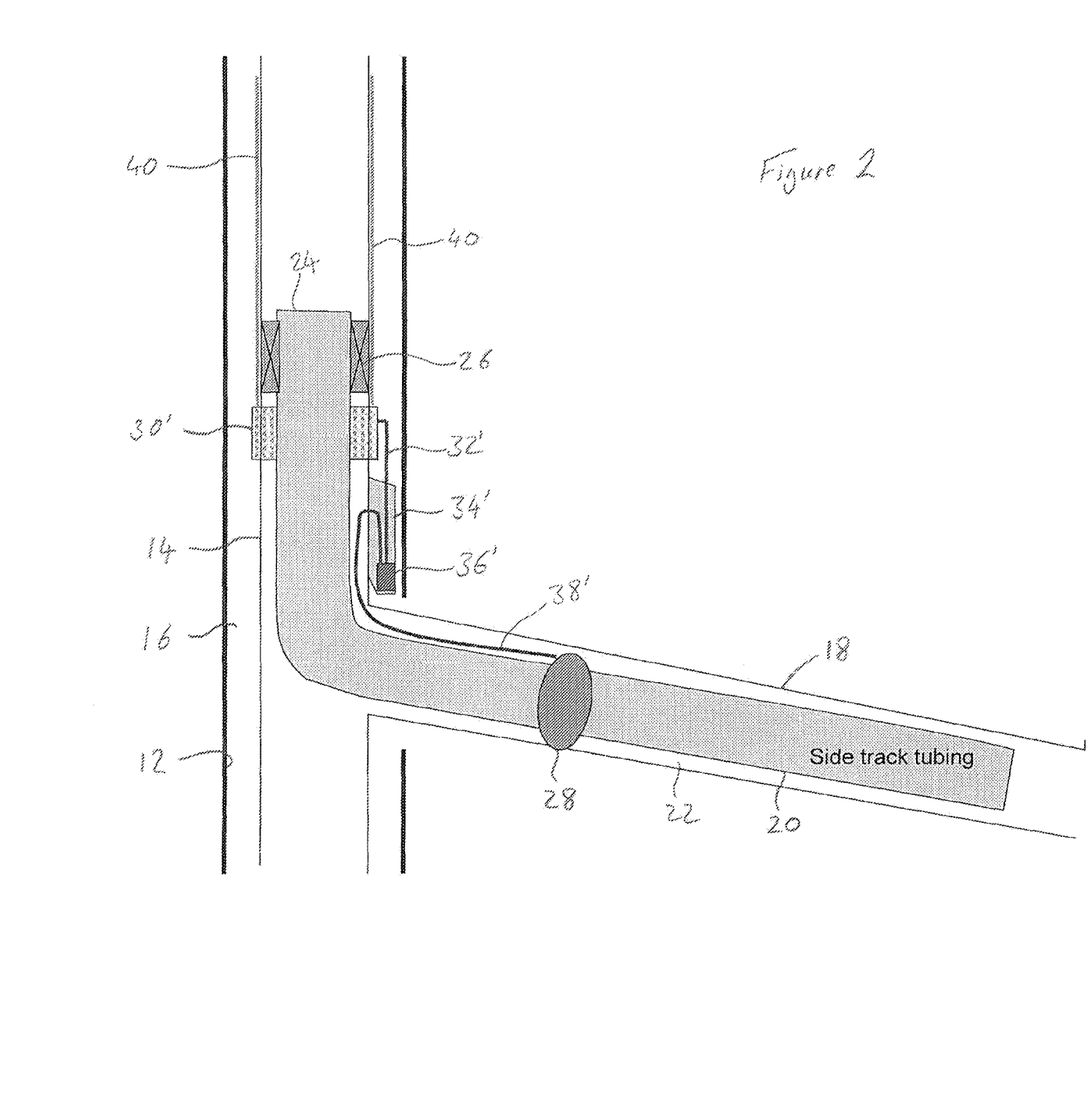
FIG. 2 illustrates an alternative to the embodiment shown in FIG. 1 of a connection for transmitting power and/or signals to/from a location in a well branch.

FIG. 2 shows a similar arrangement to FIG. 1, where equivalent features have the same reference numerals, with features that have modified locations indicated with a "prime" marker. In this case the inductive coupler 30' and the side pocket 34' are located on the production tubing 14 below the top end 24 of the side track tubing 20, and the cable 38' is fed through to the sensor/load assembly 28 in the sidetrack outside the side track tubing 20.

As shown in FIGS. 1 and 2, the cable 38, 38' is connected directly to the sensor/load 28. However, particularly where the side track extends for a long distance from the main well bore, the cable could be connected to a further inductive coupler for relaying the power/signals along the side track by a further induced current/current transformer arrangement.

The arrangement shown in FIG. 1 has the advantage that the cable is protected inside the tubing during the installation or 'running in' in the well. Assembly of the connection in the side pocket can be done with a tool in a separate operation after the TTRD branch completion is in place. Alternatively, the complete assembly of the sensor/load assembly 28, connection 36 and cable 38 could be retrofitted in the well using a wire-line. The arrangement shown in FIG. 2 is more compatible with normal cabled completions, with the cable clamped to the outside of the side track tubing 20. However, in this case the connection in the side pocket 34' would have to be made when the side track tubing 20 is landed (i.e. prior to installation). Also, having the cable 38' on the outside of the tubing 20 makes it less protected and more susceptible to damage while running in.

The connection 36, 36' in the side pocket 34 could be any regular wet mate connector, or it could be a dedicated inductive coupler.

As shown in FIGS. 1 and 2, the production tubing 14 up to the inductive couplers 30, 30' is insulated with an outer layer or coating of insulation 40. This is provided to reduce losses due to parasitic conductance. This is particularly important for the transmission of power to reduce losses, although not so important for data signals transmission where the signal content can usually be regenerated even if more than 99% of the current strength is lost. Although shown in the form of a coating, the electrical insulation of the tubing can be achieved in a variety of ways, examples of which include:
  a coating on the tubing
  a non conductive annulus fluid (and non conducting centralizers)
  in-cemented sections of tubing using cement or other curing substances (e.g. polymers) with low electrical conductivity
  introducing parts in the tubing, for example near the branch exit window or other critical locations, having a low electrical conductivity (e.g. ceramic parts or coatings).

In some cases, where the production tubing is encased in cement (as described above), the cement itself may have sufficient insulating properties to keep power losses to an acceptable level.

Figure 3:
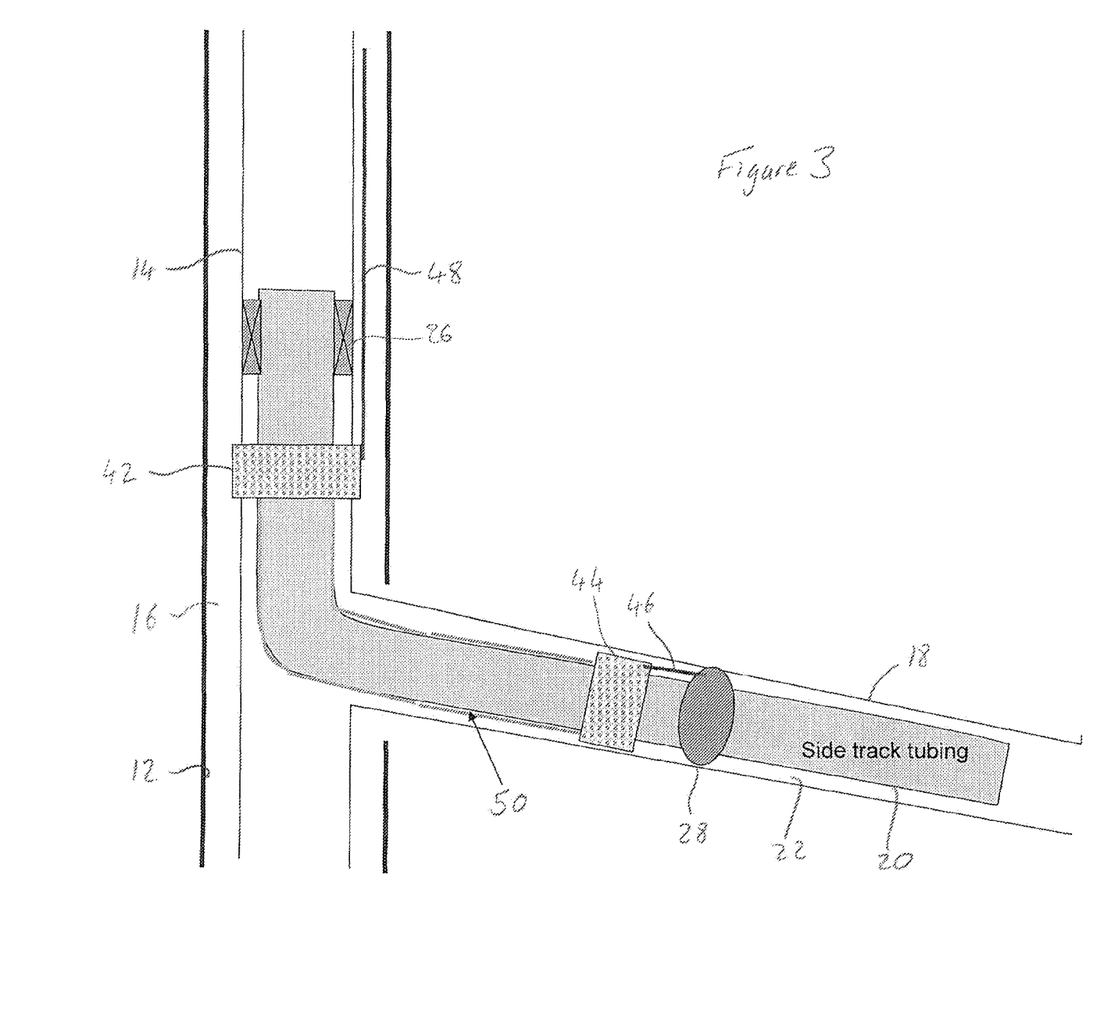
FIG. 3 illustrates another embodiment of a connection for transmitting power and/or signals to/from a location in a well branch.

FIG. 3 illustrates another embodiment illustrating a second of the principle ways that an induced current arrangement can be used for transmitting power and/or signals in a well having a TTRD branch. Again equivalent features to those shown in FIG. 1 have the same reference numerals. In this embodiment the relaying of power/signals into the TTRD branch is by way of an induced current/current transformer arrangement. A first inductive coupler or current transformer 42 is located in the main well, while a second inductive coupler or current transformer 44 is located around the side track tubing 20 in the branch. The first inductive coupler 42 is preinstalled on the production tubing 14, but preferably without any metal core in which to induce a current. This first inductive coupler 42 is located between the open end 24 of the side track tubing 20 in the main well and the exit position of the TTRD branch. The second inductive coupler 44 has a connection 46 to the sensor/load assembly 28. After installation of the TTRD branch completion, a current can be induced on the side track tubing 20 at the first inductive coupler 42 for transmitting power to the side track, while a current signal induced in the side track tubing at the second inductive coupler 44 will be picked up at the first inductive coupler 42. The first inductive coupler 42 has a connection, which in this embodiment is shown in the form of a cable 48, for power/signal transmission from/to the upper node location (which might be at or near the surface).

The first inductive coupler 42 is shown positioned around both the production tubing 14 and the side track tubing 20, which is inside the production tubing 14. However, to avoid unacceptably high power loss the position of first inductive coupler 42 is selected to minimise any current induced in the production tubing 14 below the hanger/packer 26. For example, the first inductive coupler 42 may comprise coils and/or a magnetic core that are wrapped around the side track tubing 20 in the annular space between the side track tubing 20 and the production tubing 14. As long as the coils of the first inductive coupler 42 are on the inside of the production tubing 14 no (or very limited) current will be induced in the production tubing (although some of the return current may flow in the production tubing if this is the path of the least resistance). Note, however, that the packer 26 acts as the grounding for the current induced in the first inductive coupler 42. Hence there needs to be current flow in some parts of the tubing 14, but ideally this can be confined to a region close to the packer 26. For short distances losses from the tubing may be acceptable, but to minimise losses over longer distances the longitudinal current going down the well from the inductive coupler 42 needs to be minimised by some means. One possibility is to eliminate conductive material in the tubing 14 within the inductive coupler 42, for example by having a length of the tubing 14 formed of a non-conductive material. Alternatively the conductive path in the tubing 14 could be broken by adding a non conducting pup joint just below the inductive coupler 42.

In FIG. 3, the side track tubing 20 between the first and second inductive couplers 42, 44 is shown insulated with an outer layer or coating of insulation 50. Any suitable means for insulating the tubing may be used, including those described above in relation to FIGS. 1 and 2. This insulation is provided to reduce losses due to parasitic conductance, which may be significantly higher at the TTRD branch location where the side track tubing 20 passes through the TTRD branch junction.

Figure 4:
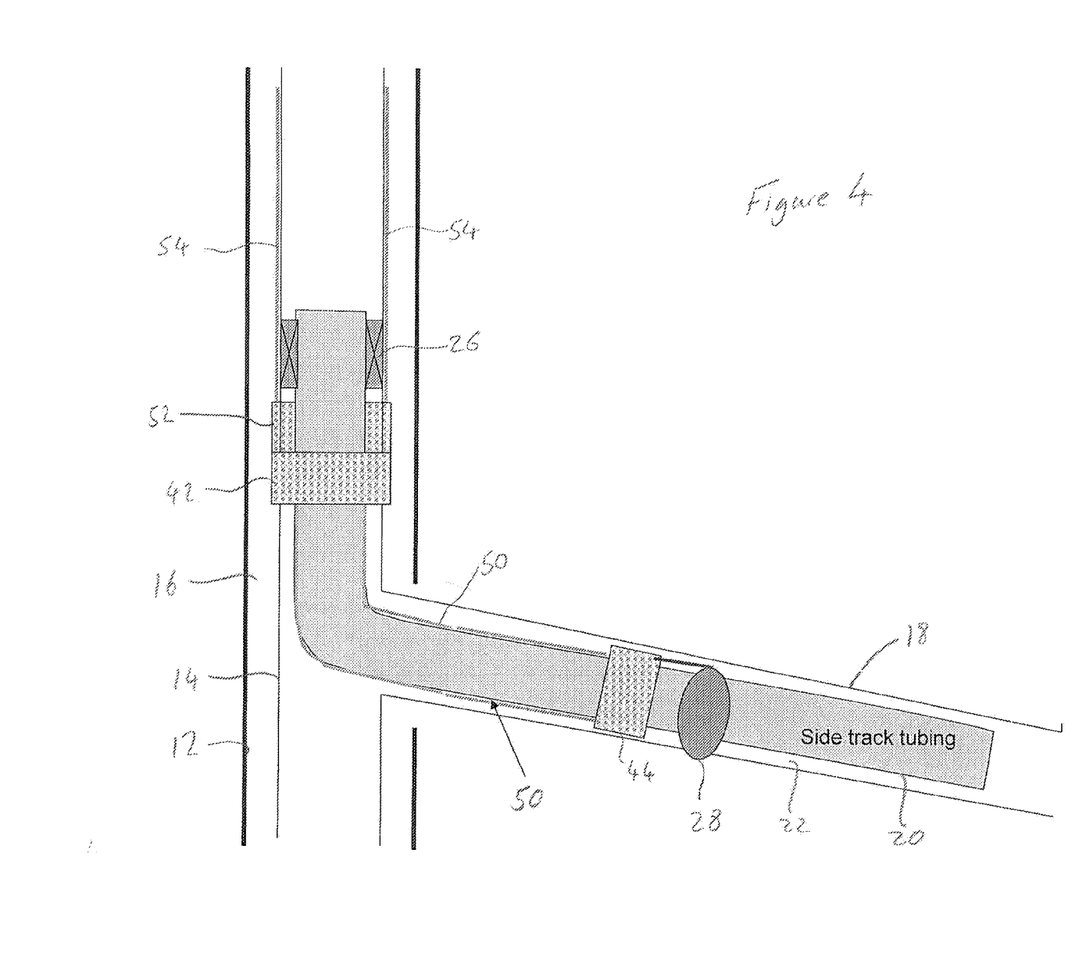
FIG. 4 illustrates an alternative to the embodiment shown in FIG. 3 of a connection for transmitting power and/or signals to/from a location in a well branch.

FIG. 4 illustrates an alternative arrangement to that of FIG. 3, in which the power/signal transmission above the first inductive coupler 42 is provided by an additional induced current/current transformer arrangement. Again equivalent features to those shown in FIGS. 1 to 3 have the same reference numerals. In this case a third inductive coupler 52 is located on the production tubing 14 just above, and with a connection (not shown) to the first inductive coupler 42. The outside of the production tubing 14 above the third inductive coupler 52 has insulation 54. The third inductive coupler 52 is at the bottom end of an upper conductive loop which needs to be grounded to the formation while the power going to the branch is split off and transferred to the first inductive coupler 42. The first and third inductive couplers 42 and 52 could be implemented as one device. Provided the circular tangential component of the magnetic field can be transferred from outside of the production tubing 14 to the inside and the electrical current is allowed to flow in the original production tubing. For example, this might be achieved using a section of non-magnetic metal tubing on top a magnetic inner core with electrical insulation inbetween.

Figure 5:
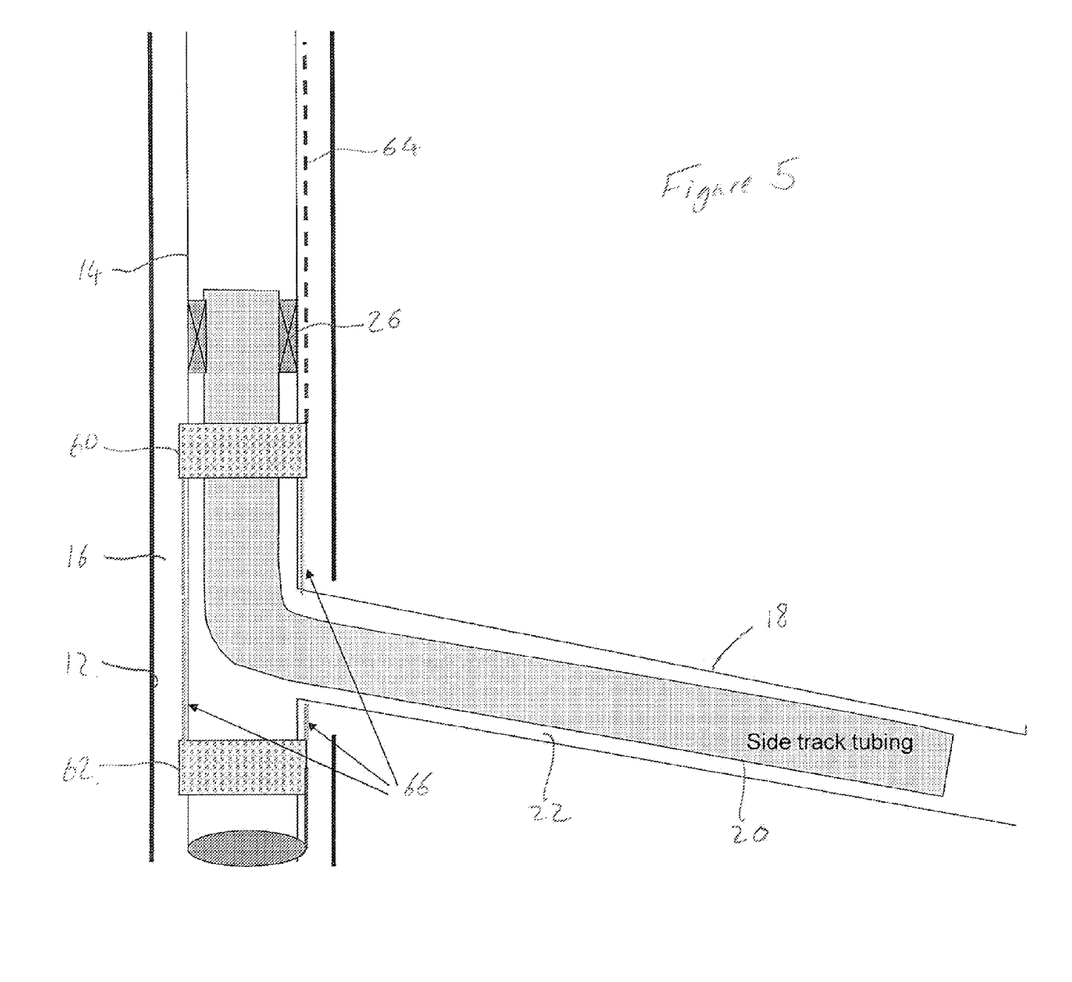
FIG. 5 illustrates an embodiment of a connection for transmitting power and/or signals to/from a location in a well below a branch.

FIG. 5 illustrates an embodiment of a connection for transmitting power and/or signals to/from a location in a well below a branch. Again equivalent features to those shown in FIG. 1 have the same reference numerals. An induced current/current transformer arrangement is used to bridge the region of the main well where the TTRD branch occurs. This means that transmission of power/signals to/from the lower part of the main well bore can be established, or maintained if previously established. As shown in FIG. 5, an upper inductive coupler 60 is located around the production tubing 14 just above the location where the TTRD branch 18 is taken off the production tubing 14. A lower inductive coupler 62 is located below the TTRD branch 18. A communication link 64 is provided for transmitting power/signals between the surface and the upper inductive coupler 60. This could, for example, be a cable or other transmission means of choice.

Thus power/signals can be transmitted to/from the main well bore below the TTRD branch by inducing a current in the production tubing at the upper or lower inductive coupler on one side of the TTRD branch and picking up the induced current at the other inductive coupler.

In order for this to work, the contact resistance between the exit window and the casing (or the formation) should be of the same order of magnitude as the electrical resistance of the production tubing between the upper and lower inductive couplers 60, 62. Although in an idealised situation there would be no physical contact, and so a very high contact resistance, in reality it is almost impossible to avoid some contact. It is also possible to utilize the frequency in the reactive part of the impedance to reduce losses at the exit point relative to the energy transfer to the lower inductive coupler.

Particularly with the transmission of power, this will generally only be at one frequency, and so the frequency can be tuned for optimum transfer of power between the two inductive couplers 60, 62. Both the resistive parts of the impedances and the reactive part of the leakage impedance, if significant, need also to be considered as well as the source impedance for power matching.

The induced current will be divided between the transmission to the next inductive coupler and losses to the formation in proportion to the conductance of each path. As stated above for signal transmission large losses can be tolerated, but not for power transmission. However, the distance between the upper and lower inductive couplers 60, 62 is relatively short and the conductance in the production tubing 14 between the couplers will be relatively high (compared with typical lengths of production tubing in well bores that can extend for kilometers). To control the resistance metal to metal contact between production tubing 14 and the well bore casing (which is very effectively coupled to the formation/ground) should be avoided. One way to control this is to coat the production tubing with an insulation material (as indicated by insulation 66 in FIG. 5) between the upper and lower couplers at locations where it might contact the casing. Other, additional or alternative methods include use of centralizers, polishing the exit window, lining the exit window with a non conductive material and cementing the tubing in place with a cement having a modest electrical conductivity.

Figure 6:
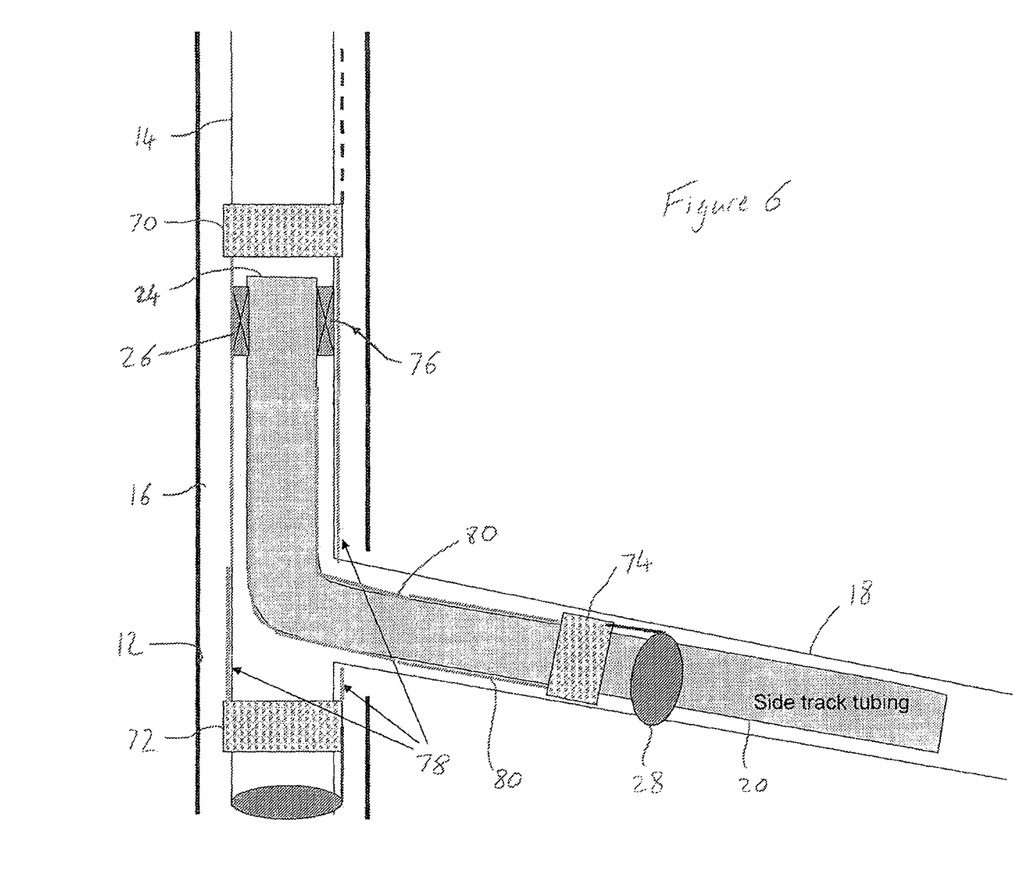
FIG. 6 illustrates an embodiment of a connection for transmitting power and/or signals to/from a location in a well branch as well as transmitting power and/or signals to/from a location in the well below the branch.

FIG. 6 illustrates an embodiment of a connection for transmitting power and/or signals to/from a location in a well branch as well as transmitting power and/or signals to/from a location in the well below the branch (as in FIG. 5). Equivalent features to those shown in FIGS. 1 and 5 have the same reference numerals. The arrangement is similar to that shown in FIG. 5, except that an upper inductive coupler 70 is located above the open end 24 of the side track tubing 20 to induce current in the production tubing 14. A second inductive coupler 72 is located below the TTRD branch 18 (as with the inductive coupler 62 of FIG. 5). A further inductive coupler 74 is located on the side track tubing 20 in the branch 18. Conductive contacts 76 provide a conductive bridge between the production tubing 14 in the main well bore and the side track tubing 20 inside the production tubing. These contacts 76 may be "slips" or other contacts that maintain electrical connection and may be mounted in the packers 26. The slips in a normal packer or hanger assembly will normally achieve this, having metal teeth that are expanded into the original tubing.

For power transmission down the well, the current path from the upper inductive coupler 70 will be divided between the production tubing 14 in the main well bore where it will be picked up by the lower inductive coupler 72, and the side track tubing 20 where it will be picked up by the further inductive coupler 74 in the branch 18. To minimise parasitic losses it is preferable for the further inductive coupler 74 to be located as close to the junction between the main well bore and the TTRD branch as possible. To reduce losses, as well as insulation 78 being provided on the production tubing 14 between the upper and lower inductive couplers 70, 72, a layer or coating of insulation 80 is provided on the side track tubing 20 at least as far as the further inductive coupler 74. As previously explained, in some cases the insulation provided by cement or a fluid in the annular spaces 16, 22 may be sufficient.

Figure 7:
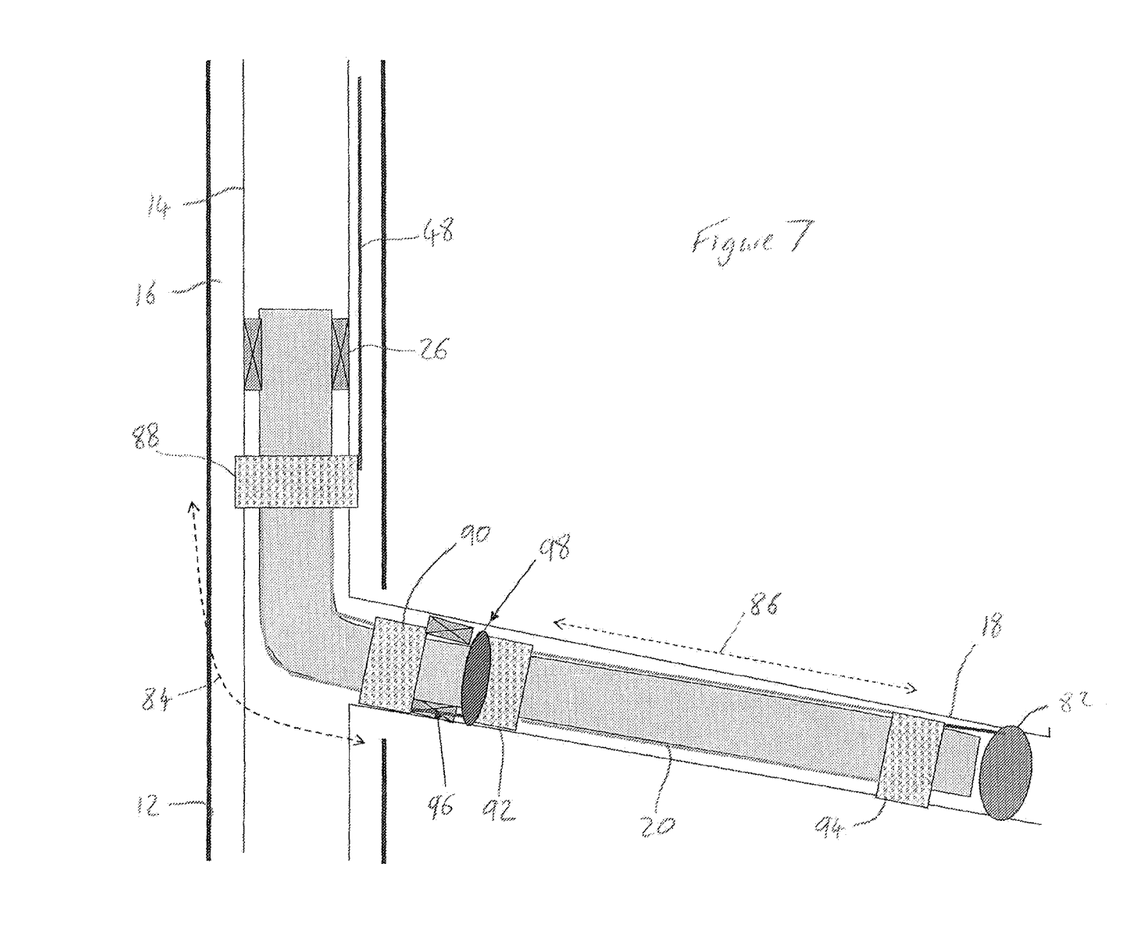
FIG. 7 illustrates another embodiment of a connection for transmitting power and/or signals to/from a location in a well branch.

FIG. 7 illustrates another embodiment for transmitting power and/or signals to/from a location in a well branch. Equivalent features to those shown in FIGS. 1 to 6 have the same reference numerals. In this case a sensor/load assembly 82 is at a location some considerable distance away from the TTRD branch junction with main well. The power/signals are transmitted via two induced current/current transformer sections. An upper section 84 is provided for transmission through the TTRD branch 18, while a lower section 86 is provided along the side track tubing 20 in the branch. The upper section has an upper inductive coupler 88 in the main well bore and a lower inductive coupler 90 on the side track tubing 20 in the branch. This upper section is essentially similar to the embodiment of FIG. 3. The lower section has an upper inductive coupler 92 and a lower inductive coupler 94, both of which are located on the side track tubing 20. The lower inductive coupler 94 is connected to the sensor/load assembly 82. A connection is made between the lower inductive coupler 90 of the upper section 84 and the upper inductive coupler 92 of the lower section 86, further details of which are described below.

Thus power is transmitted down the well to the sensor/load assembly 82 via the upper section 84 (as described above for the embodiment of FIG. 3) and then via the lower section 86 by inducing a current in the side track tubing 20 at the upper inductive coupler 92, and picking this up at the lower inductive coupler 94.

Although any suitable form of connection may be used to connect between the lower inductive coupler 90 of the upper section 84 and the upper inductive coupler 92 of the lower section 86, FIG. 7 illustrates a short length of cable 96 fed through a packer in the annular space 22 surrounding the side track tubing 20. Also shown is an optional electronic signal conditioning unit 98 disposed between the two sections. This may include, for example, a transformer and/or a frequency converter. Frequency conversion can be used to manipulate the reactive impedance matching for the separate sections independently.

The embodiments described above incorporate many of the advantages in using the induced current/current transformer technology to extend the transmission capabilities into a well branch. This can be done with a reduced need for accurate positioning of the branch exit window (for example relative to a cable connection). This allows greater flexibility in positioning the branch exits and not requiring the same precision in landing the TTRD branch completion.

The invention claimed is:

1. A method of installing a transmission system in a hydrocarbon production well, wherein the transmission system is operable for transmitting power and/or control signals down the well or for transmitting data signals back up the well, and wherein the well comprises a main well bore, a production tubing inside the main well bore and a branch off the production tubing, the branch comprising a side track tubing, the method comprising:
 installing a first inductive coupler of an induced current transmission arrangement around the production tubing in the main well bore at an axial position above an exit window and below an end of the side track tubing in the production tubing, wherein the exit window is formed in the production tubing where a portion of the side track tubing extends into and substantially parallel to the production tubing and through said exit window;
 installing a second inductive coupler of an induced current transmission arrangement around the production tubing below said exit window such that the branch exits the production tubing between the first and second inductive couplers; and
 providing a sensor and/or load assembly in the main well bore below the branch to provide said data signals to and/or receive said power and/or control signals from the second inductive coupler;
 connecting the sensor/load assembly to the first inductive coupler via a communication link comprising an induced current signal transmission arrangement provided by the first and second inductive couplers,
 wherein the side track tubing is conductively isolated from the production tubing at said exit window, by providing insulation material on the surface of the production tubing to insulate all of the production tubing from a location of the production tubing starting at a bottom portion of the first inductive coupler to a location of the production tubing ending at an upper portion of the second inductive coupler to control resistance metal to metal contact between the production tubing and the main well bore to ensure that power transmission losses between the first inductive coupler and the second inductive coupler are minimized.

2. The method of claim 1, wherein a current is induced in the production tubing, and the production tubing provides a transmission medium for said data and/or power and/or control signals between the first inductive coupler and a position of the production tubing closer to the surface when compared to the position of the first inductive coupler.

3. The method of claim 2, further comprising installing an induced current signal transmission arrangement for relaying said data signals from the first inductive coupler to a node at a location higher up the well and/or for supplying said power and/or control signals to the first inductive coupler.

4. The method of claim 1, further comprising connecting a cable between the first inductive coupler and a node at a location higher up the main well bore for relaying said data signals and/or for supplying said power and/or control signals.

5. The method of claim 1, wherein one or more of the inductive couplers has an impedance matched to that of another coupler to optimise power and/or signal transfer.

6. The method of claim 1, further comprising providing electrical insulation to at least a portion of the production tubing and/or the side track tubing for reducing losses due to parasitic conductance from the tubing.

7. A hydrocarbon production well installation comprising:
 a main well bore;
 a production tubing inside the main well bore;
 a branch off the production tubing, the branch comprising a side track tubing, wherein a portion of the side track tubing extends into and substantially parallel to the production tubing and through an exit window formed in the production tubing, and wherein the side track tubing is conductively isolated from the production tubing at said exit window;
 a first inductive coupler of an induced current transmission arrangement, the first inductive coupler being disposed around the production tubing in the main well bore, at an axial position above said exit window and below an end of the side track tubing in the production tubing,
 a second inductive coupler of an induced current transmission arrangement, the second inductive coupler being disposed around the production tubing below said exit window such that the branch exits the production tubing between the first and second inductive couplers, and
 a sensor and/or load assembly in the main well bore below the branch for providing sensor data signals to and/or receive power and/or control signals from the second inductive coupler,
 wherein the sensor/load assembly is connected to the first inductive coupler via a communication link comprising an induced current signal transmission arrangement provided by the first and second inductive couplers, by providing insulation material on the surface of the production tubing to insulate all of the production tubing from a location of the production tubing starting at a bottom portion of the first inductive coupler to a location of the production tubing ending at an upper portion of the second inductive coupler to control resistance metal to metal contact between the production tubing and the main well bore to ensure that power transmission losses between the first inductive coupler and the second inductive coupler are minimized.

8. The installation of claim 7, wherein the branch is a through-tube rotary drilled, TTRD, branch wherein the side track tubing extends from inside the production tubing into the TTRD branch.

9. The installation of claim 7, further comprising a cable connected to the first inductive coupler for relaying data signals to a node at a location higher up the well and/or for supplying power and/or control signals.

10. The installation of claim 7, further comprising an induced current signal transmission arrangement for relaying said data signals from the first inductive coupler to a node at a location higher up the well and/or for supplying said power and/or control signals to the first inductive coupler.

11. The installation of claim 10, wherein the induced current signal transmission arrangement for relaying said data signals and/or for supplying said power and/or control signals from/to the first inductive coupler comprises a third inductive coupler, the first and third inductive couplers being implemented as one device.

12. The installation of claim 7, wherein the production tubing between the first and third inductive couplers comprises an electrical insulation material or coating.

13. The installation of claim 7, wherein the first/second inductive coupler is a current transformer.

14. The installation of claim 7, wherein one or more of the inductive couplers has an impedance matched to that of another coupler to optimise power and/or signal transfer.

15. The installation of claim 7, wherein at least a portion of the production tubing and/or the side track tubing comprises electrical insulation for reducing losses due to parasitic conductance from the tubing.

16. The installation of claim 15, wherein the insulation comprises one or more of:
- a coating on the tubing;
- a non-conductive annulus fluid;
- non-conducting tubing centralizers;
- in-cemented sections of tubing comprising cement or other curing substances with low electrical conductivity; and
- parts of the tubing formed of a material having a low electrical conductivity.

17. The installation of claim 16, wherein said other curing substances include polymers.

18. A method of installing a transmission system in a hydrocarbon production well, wherein the transmission system is operable for transmitting power and/or control signals down the well or for transmitting data signals back up the well, and wherein the well comprises a main well bore, a production tubing inside the main well bore and a branch off the production tubing, the branch comprising a side track tubing, the method comprising:
- installing a first inductive coupler of an induced current transmission arrangement around the production tubing in the main well bore at an axial position above an exit window and below an end of the side track tubing in the production tubing, wherein the exit window is formed in the production tubing and where a portion of the side track tubing extends into and substantially parallel to the production tubing and through said exit window, wherein said exit window is formed in the production tubing,
- installing a second inductive coupler of an induced current transmission arrangement around the side track tubing below said exit window such that the branch exits the production tubing between the first and second inductive couplers, and
- providing a sensor and/or load assembly in the branch off the production tubing to provide said data signals to and/or receive said power and/or control signals from the second inductive coupler,
- connecting the sensor/load assembly to the first inductive coupler via a communication link comprising an induced current signal transmission arrangement provided by the first and second inductive couplers,
- wherein the side track tubing is conductively isolated from the production tubing at said exit window, by providing insulation material on the surface of the production tubing to insulate all of the production tubing from a location of the production tubing starting at a bottom portion of the first inductive coupler to a location of the production tubing ending at an upper portion of the second inductive coupler to control resistance metal to metal contact between the production tubing and the main well bore to ensure that power transmission losses between the first inductive coupler and the second inductive coupler are minimized.

19. The method of claim 18, wherein a current is induced in the production tubing, and the production tubing provides a transmission medium for said data and/or power and/or control signals between the first inductive coupler and a position of the production tubing closer to the surface when compared to the position of the first inductive coupler.

20. The method of claim 18, further comprising connecting a cable between the first inductive coupler and a node at a location higher up the main well bore for relaying said data signals and/or for supplying said power and/or control signals.

21. The method of claim 20, further comprising installing an induced current signal transmission arrangement for relaying said data signals from the first inductive coupler to a node at a location higher up the well and/or for supplying said power and/or control signals to the first inductive coupler.

22. The method of claim 18, wherein one or more of the inductive couplers has an impedance matched to that of another coupler to optimise power and/or signal transfer.

23. The method of claim 18, further comprising providing electrical insulation to at least a portion of the production tubing for reducing losses due to parasitic conductance from the tubing.

24. A hydrocarbon production well installation comprising:
- a main well bore;
- a production tubing inside the main well bore;
- a branch off the production tubing, the branch comprising a side track tubing, wherein a portion of the side track tubing extends into and substantially parallel to the production tubing and through an exit window formed in the production tubing, and wherein the side track tubing is conductively isolated from the production tubing at said exit window, by providing insulation material on the surface of the production tubing to insulate all of the production tubing from a location of the production tubing starting at a bottom portion of the first inductive coupler to a location of the production tubing ending at an upper portion of the second inductive coupler to control resistance metal to metal contact between the production tubing and the main well bore to ensure that power transmission losses between the first inductive coupler and the second inductive coupler are minimized;
- the first inductive coupler of an induced current transmission arrangement, the first inductive coupler disposed around the production tubing in the main well bore, at an axial position above said exit window and below an end of the side track tubing in the production tubing, the second inductive coupler of an induced current transmission arrangement, the second inductive coupler disposed around the side track tubing below said exit window such that the branch exits the production tubing between the first and second inductive couplers, and a sensor and/or load assembly in the main well bore below the branch for providing sensor data signals to and/or receive power and/or control signals from the second inductive coupler, whereby the sensor/load assembly is connected to the first inductive coupler via a communication link comprising an induced current signal transmission arrangement provided by the first and second inductive couplers.

25. The installation of claim 24, wherein the branch is a through-tube rotary drilled, TTRD, branch wherein the side track tubing extends from inside the production tubing into the TTRD branch.

26. The installation of claim 24, further comprising a cable connected to the first inductive coupler for relaying data signals to a node at a location higher up the well and/or for supplying power and/or control signals.

27. The installation of claim 24, further comprising an induced current signal transmission arrangement for relaying said data signals from the first inductive coupler to a node at a location higher up the well and/or for supplying said power and/or control signals to the first inductive coupler.

28. The installation of claim 27, wherein the induced current signal transmission arrangement for relaying said data signals and/or for supplying said power and/or control signals from/to the first inductive coupler comprises a third inductive coupler, the first and third inductive couplers being implemented as one device.

29. The installation of claim 24, wherein the production tubing between the first and second inductive couplers comprises an electrical insulation material or coating.

30. The installation of claim 24, wherein the first/second inductive coupler is a current transformer.

31. The installation of claim 24, wherein one or more of the inductive couplers has an impedance matched to that of another coupler to optimise power and/or signal transfer.

32. The installation of claim 24, wherein at least a portion of the production tubing and/or the side track tubing comprises electrical insulation for reducing losses due to parasitic conductance from the tubing.

33. The installation of claim 32, wherein the insulation comprises one or more of:
a coating on the tubing;
a non-conductive annulus fluid;
non-conducting tubing centralizers;
in-cemented sections of tubing comprising cement or other curing substances with low electrical conductivity; and
parts of the tubing formed of a material having a low electrical conductivity.

34. The installation of claim 33, wherein said other curing substances include polymers.

* * * * *